United States Patent [19]

Hutchison et al.

[11] Patent Number: 5,832,741
[45] Date of Patent: Nov. 10, 1998

[54] FILTER/DRIER FOR REVERSIBLE HEAT PUMP SYSTEM

[75] Inventors: Wayne K. Hutchison, Ontario; William N. Eybergen, Dutton, both of Canada

[73] Assignee: Eaton Corporation, Cleveland, Ohio

[21] Appl. No.: 732,739

[22] Filed: Oct. 18, 1996

[51] Int. Cl.$^6$ ................................................ F25B 43/04
[52] U.S. Cl. ........................... 62/475; 62/324.6; 210/136; 210/424
[58] Field of Search .............................. 62/474, 475, 509, 62/512, 324.6, 503; 210/117, 136, 295, 424; 137/597, 106

[56] References Cited

U.S. PATENT DOCUMENTS

| | | | |
|---|---|---|---|
| 4,756,166 | 7/1988 | Tomasov | 62/474 |
| 5,038,582 | 8/1991 | Takamatsu | 62/474 |

*Primary Examiner*—John M. Sollecito
*Attorney, Agent, or Firm*—Roger A. Johnston

[57] ABSTRACT

A bi-directional filter/drier having a flat header welded to a casing with a desiccant canister disposed in the casing. The header has a dedicated low side pressure inlet port formed in the flat which communicates through a pair of oppositely disposed check valves in a cross passage with two separate bi-directional inlet/outlet ports into which low side pressure flow is permitted to by-pass the desiccant to the bi-directional ports. Individual passages, each with a stiffer check valve are provided between the bi-directional ports for permitting high side pressure to flow in either port into the desiccant. A stand pip through the desiccant is connected to an interior port in the header and communicates with a dedicated outlet port in header exterior.

15 Claims, 2 Drawing Sheets

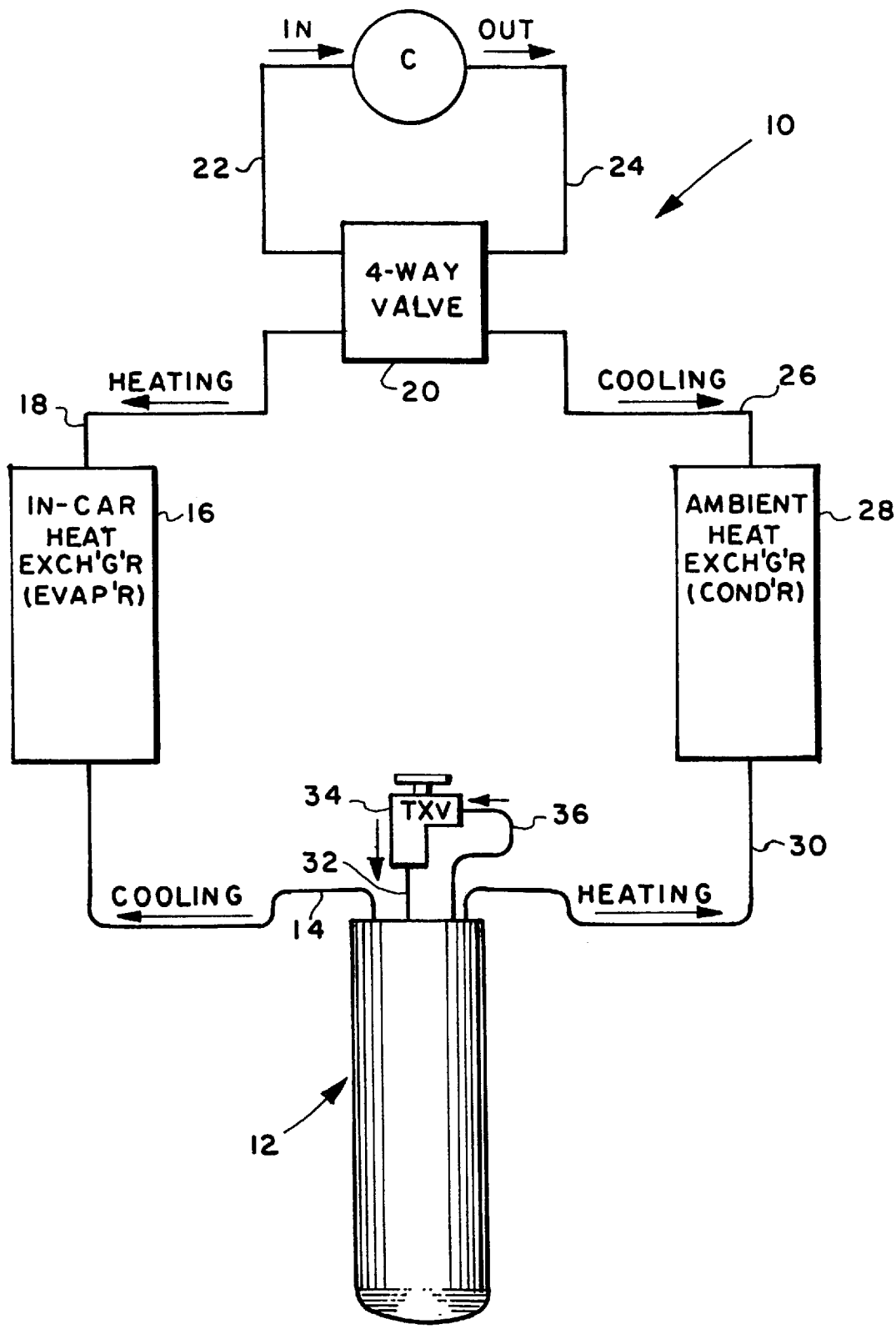

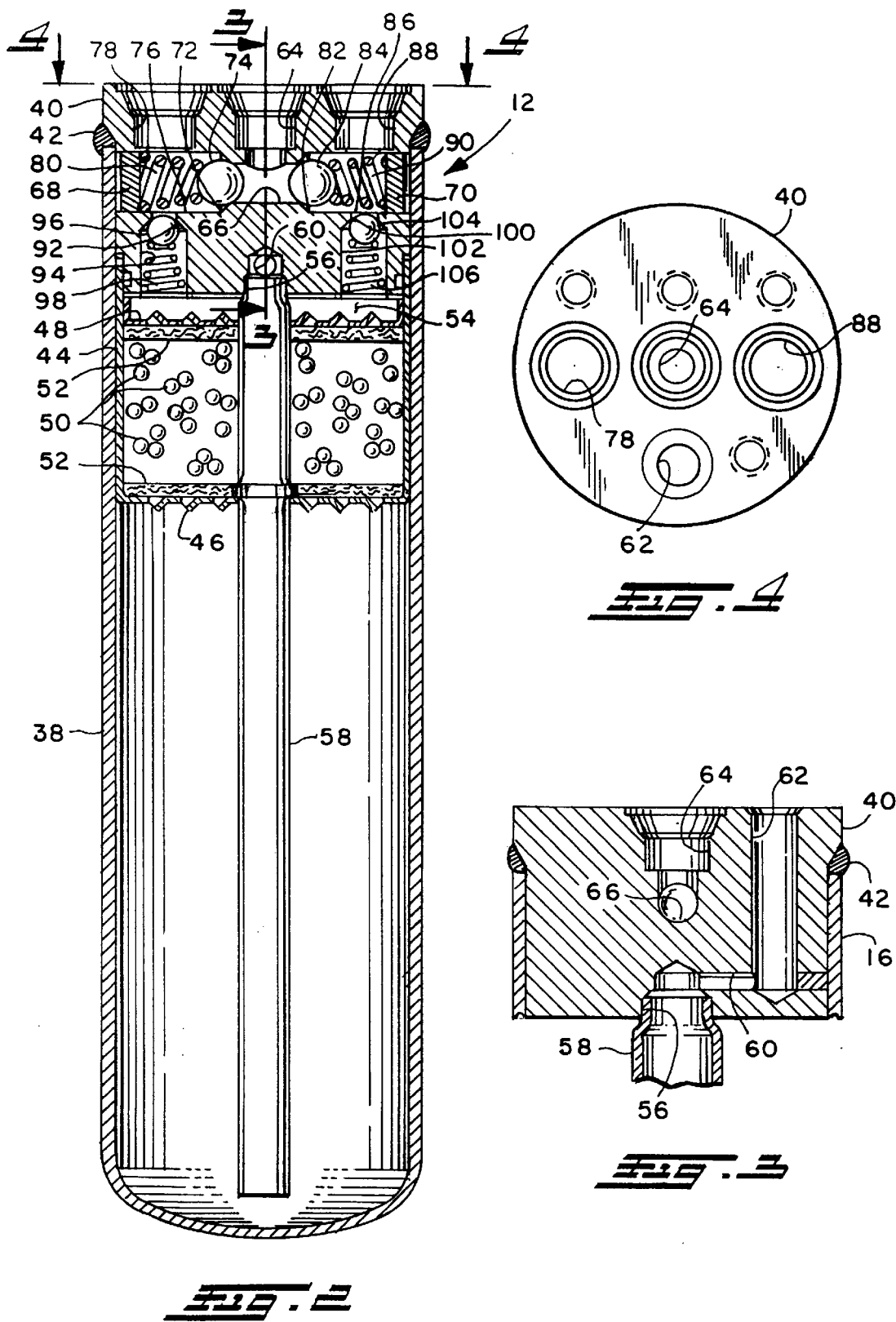

FILTER/DRIER FOR REVERSIBLE HEAT PUMP SYSTEM

BACKGROUND OF THE INVENTION

The present invention relates to reversible refrigeration or heat pump systems and particularly such systems for climate control of motor vehicle occupant compartments and more particularly to such systems for motor vehicles not having heat from an internal combustion engine available for heating the occupant compartment during cold climate operation. Situations of the aforesaid type are encountered in vehicles powered by traction motors supplied with electrical power from onboard storage sources such as fuel cells or batteries as opposed to heat generating engines.

Therefore it has been desired to provide a reversible heat pump or from the vehicle air conditioning system for occupant compartment heating of a motor vehicle. In providing such a system, it has been found necessary to provide a filter/drier for the circulating refrigerant therethrough which is capable of reversible or bi-directional flow during periods of operation of the system for heating the passenger compartment. A filter/drier which is capable of handling reversible refrigerant flow must have inlet/outlets which are designed to accommodate the high-side pressures of the refrigerant discharging when the compressor flow is in either direction.

Heretofore, filter/driers for motor vehicle occupant compartment air conditioning systems have been required to handle flow in only one direction by virtue of the system being operated only in the cooling mode. Thus, such one-way flow filter/driers have not been satisfactory for applications which require reversible flow in the refrigeration system for the heating mode of operation. Accordingly, it has been desired to find a way or means of providing a filter/drier for a reversible automotive heat pump system which is capable of handling the reversed flow from the high pressure or discharge side of the refrigerant compressor.

SUMMARY OF THE INVENTION

The present invention provides a filter/drier for an automotive air conditioning system which is intended to operate in a reverse flow mode as a heat pump for providing occupant compartment heating as well as cooling. The filter/drier of the present invention has a deep drawn tubular canister which is attached to a header and which contains desiccant for removing moisture from the refrigerant. The header has a single inlet for receiving low pressure discharge from the expansion device or thermal expansion valve and returning the flow by means of check valves which open to permit the refrigerant to enter one of two individual ports which is not receiving high pressure flow from the compressor in the instant mode of operation. The low pressure flow thus bypasses the desiccant and is returned to the compressor inlet. High pressure flow entering either of the bi-directional high pressure ports opens a high pressure check valve associated with the individual port and permits high pressure flow through the desiccant and exhaust through a stand pipe connected to the inside of the folder which communicates with a separate high pressure outlet port on the exterior of the header adapted to be connected to the inlet of the expansion device or thermal expansion valve. Thus, either of the high pressure ports may receive flow and direct it via separate one way check valves to the desiccant.

BRIEF DESCRIPTION OF THE DRAWINGS

FIG. 1 is a block diagram of a reversible refrigerant or heat pump system employing the bi-directional filter/drier of the present invention;

FIG. 2 is a cross-section of the filter/drier of the present invention;

FIG. 3 is a section view taken along section indicating lines 3—3 of FIG. 2; and, FIG. 4 is a view taken along section indicating lines 4—4 of FIG. 2.

DETAILED DESCRIPTION

Referring to FIG. 1, a reversible air conditioning or heat pump system for heating and cooling a vehicle occupant compartment is indicated generally at 10 and includes a bi-directional filter/drier indicated generally at 12 which is connected at one bi-directional or high pressure port to a conduit 14 which is connected to one side of an in-car heat exchanger commonly known as an evaporator in an air conditioning system as denoted by reference numeral 16 and which has the other side thereof connected via conduit 18 one port of a four way or reversing valve 20. A second port of valve 20 is connected via conduit 22 to the intake of a refrigerant compressor indicated by the reference character "C". The high pressure discharge or outlet of the compressor C is connected via conduit 24 to a third port of valve 20. A fourth port of valve 20 is connected via conduit 26 to one side of an ambient air heat exchanger 28 commonly referred to as a condenser in an automotive air conditioning system and which has the opposite side thereof connected via conduit 30 to a second bi-directional or high pressure port of the filter/drier 12.

A dedicated low pressure inlet port of filter/drier 12 is connected via conduit 32 to the pressure outlet of an expansion device, typically a thermal expansion valve denoted by reference numeral 34. A dedicated high pressure outlet port of the filter/drier 12 is connected via conduit 36 to the high pressure inlet of the valve 34.

Referring to FIGS. 2, 3 and 4, the filter/drier 12 has a closed end tubular casing 38 which has the open end thereof secured to a generally cylindrical header 40 having a flat or generally planar exterior surface and secured and sealed to the casing 38 by weldment 42. In the presently preferred practice casing 38 and header 40 are formed of aluminum material. The casing contains a basket 44 perforated through its bottom at 46 and closed with a perforated cover 48 and filled with desiccant material 50. A layer of filter material 52 is disposed adjacent the perforations on the interior of the basket. The cover of the basket is spaced from the undersurface of the header 40 and defines a plenum chamber 54 between the basket cover 48 and the undersurface of the header 44.

A high pressure outlet port or first port 56 is formed centrally in the undersurface of the header and has a stand pipe 58 secured therein for example by press fitting and which communicates with a cross passage 60 which intersects the dedicated high pressure outlet port 62 formed in the upper surface or exterior surface of the header 40.

A centrally disposed dedicated low pressure inlet port 64 is provided in the upper or exterior surface of the header and communicates with a cross passage 66 formed in the header by cross drilling and inserting of plugs 68, 70 in the opposite ends thereof. It will be understood that the dedicated low pressure inlet port 64 is to be connected to conduit 32 in FIG. 1 to receive discharge from the expansion valve 34.

Cross passage 66 has a valve seat 72 formed therein against which is seated a check ball 74; and, valve seat 72 communicates with a second passage 76 which communicates with a bi-directional fourth port 78 formed in the upper surface of the header. The port 78 is connected to conduit 14 and in the cooling mode functions as a low pressure outlet port; and, in the heating mode functions as a high pressure inlet port. The check valve 74 is biased against seat 72 by a spring 80 which is capable of permitting valve 74 to open under the relatively low pressure forces of the refrigerant at the discharge pressure of the expansion valve 34.

Cross passage 66 also communicates with a valve seat 82 which has a check ball 84 seated thereon and biased thereagainst by a spring 86; and, valve seat 82 communicates with a third passage 86 which in turn communicates with a bi-directional fifth port 88 formed in the upper surface of the header which is to be connected to the conduit 30 of FIG. 1 for receiving high pressure discharge from the ambient heat exchanger 28 during the cooling mode and discharging low pressure refrigerant thereto in the heating mode. Spring 86 is set to permit the check ball to open under the relatively low pressure forces of refrigerant discharging from the expansion valve 34 via conduit 32. It will be understood that the fifth port 88 functions as an inlet/outlet port and is connected to the conduit 30.

A valve seat 92 is formed at right angles to passage 76 and communicates with passage 76 and also communicates via passage 94 to the undersurface of the header and with plenum chamber 54. A check ball 96 is seated against valve seat 92 and is held thereagainst by a relatively stiff spring 98. Check ball spring 98 is set to maintain the passage 94 closed under the discharge pressure of refrigerant from conduit 32 from the expansion valve despite the opening of check ball 74. However, when high pressure refrigerant is received in port 78 during the heating mode of operation in which heat exchanger 16 functions in an exothermic mode, check ball 96 is lifted from seat 92 and high pressure refrigerant flows into the plenum 54 through the desiccant and out through the stand pipe.

A valve seat 100 is provided for communicating at right angles thereto with passage 86; and, valve seat 10 also communicates with a passage 102 which opens to the lower surfaces of the header 40 and communicates with plenum 54. A check ball 104 is seated on the valve seat 100 and is similarly biased thereagainst by a relatively stiff spring 106. Spring 106 is operative to permit check ball 104 to open only under the pressure forces of refrigerant flow through conduit 30 applied to port 88 at high side pressures when heat exchanger 28 is functioning as an exothermic heat exchanger or condenser during the cooling mode of operation. In this mode of operation, high pressure refrigerant entering port 88 from conduit 30 and into the passage 102 flows into plenum 54 and through the desiccant to discharge through stand pipe 58, dedicated high pressure outlet port 64, which is connected to conduit 36, and the inlet of expansion valve 34.

The present invention thus provides a unique and novel receiver drier for refrigerant circulated therethrough from a reversible heat pump and is bidirectional in that separate valved ports are provided in the exterior face of the header which may serve individually either as inlets or outlets for handling refrigerant flow in either direction depending upon whether the system in operated in the cooling or in the heating mode. A central port in the face of the header is a dedicated low pressure inlet port connected for receiving flow from the system expansion valve; and, a pair of oppositely disposed check valves communicating with the low pressure inlet port provide for direct return of the refrigerant to the compressor inlet depending upon which of the opposed check valves is held closed by high pressure refrigerant in one or other of the dual function inlet/outlet ports. The present invention has all the ports conveniently located on the exterior face as a header to facilitate mounting of the filter/drier in the vehicle climate control system.

Although the invention has hereinabove been described with respect to the illustrated embodiments, it will be understood that the invention is capable of modification and variation and is limited only by the scope of the following claims.

We claim:

1. A filter/drier assembly for bi-directional flow in a reversible refrigerant system comprising:
   (a) a relatively thin walled generally tubular casing having one end closed and another end sealingly attached to a header;
   (b) a container of desiccant disposed in said casing adjacent said header;
   (c) a stand pipe received through said container and having one end attached to a first port in said header and the other end extending to a position adjacent said closed end of said casing;
   (d) a first passage in said header connecting said first port with a second port on an exterior surface of said header;
   (e) a third, fourth and fifth port formed in the exterior surface of said header;
   (f) a second passage in said header connecting said third and fourth port and including one-way valve means;
   (g) a third passage in said header connecting said third and fifth port and including one-way valve means;
   (h) a fourth passage connecting said fourth port with the interior of said casing and including one-way valve means; and
   (i) a fifth passage connecting said fifth port with the interior of said casing and including one-way valve means and, wherein refrigerant fluid supplied at a relatively low pressure to said third port can open said one-way valve means in said fourth and fifth passages and provide flow out through said fourth and fifth ports, and refrigerant supplied at a relatively high pressure to said fourth port opens said one-way valve means in said fourth passage only and flows into said casing and out only through said stand pipe and first port, and refrigerant suppled at a relatively high pressure to said fifth port opens said one-way valve means in said fifth passage and flows into said casing and out only through said stand pipe and first port.

2. The assembly defined in claim 1, wherein said one-way valve means includes a spring biased check ball.

3. The assembly defined in claim 1, wherein said header has a substantially planar exterior surface and said first, third, fourth and fifth ports are formed on said planar surface.

4. The assembly defined in claim 1, wherein said desiccant container is spaced from said header and defines a plenum communicating with said fourth and firth passages.

5. The assembly defined in claim 4, wherein said stand pipe passes centrally through said container.

6. The assembly defined in claim 1, wherein said third, fourth and fifth ports are aligned.

7. The assembly defined in claim 1, wherein said third, fourth and fifth ports are in alignment and said first port is disposed adjacent said third port spaced from said alignment.

8. The assembly defined in claim 1, wherein said second passage communicate with said fourth passage and said third passage communicates with said fifth passage.

9. The assembly defined in claim 1, wherein said second and third passages are aligned.

10. The assembly defined in claim 1, wherein said second and fourth passage intersect at right angles; and, said third and fifth passages intersect at right angles.

11. A reversible flow filter/drier assembly for a vehicle occupant compartment heat pump system comprising:

(a) a tubular casing attached and sealed at one end to a header with the end remote from the casing closed, said header having a generally planar exterior surface;

(b) desiccant material disposed in said casing;

(c) a stand pipe disposed in said casing attached to a dedicated outlet passage through said header, said outlet passage ported on the exterior surface of said header;

(d) a dedicated low pressure outlet port and a dedicated low pressure inlet port in said header exterior surface;

(e) a first bi-directional flow port in said header exterior surface;

(f) a second bi-directional flow port in said header exterior surface;

(g) a fast flow passage connecting said first bi-directional port with said low pressure inlet port and including a one-way valve;

(h) a second flow passage connecting said second bi-directional port to said low pressure inlet port and including a one-way valve;

(i) a third flow passage connecting said first bi-directidnal port to the interior of said casing including a one-way valve; and, (j) a fourth flow passage connecting said second bi-directional port to the interior of said casing, including a one-way valve, wherein low pressure flow supplied to said inlet port is operable to open said on-way valve in one of said fist and second flow passages to flow directly to one of said first and second bi-directional ports, and high pressure flow supplied to the other of said first and second bi-directional ports is operable to pen the on-way valve therein to permit flow to the interior of said casing.

12. The assembly defined in claim 11, wherein said low pressure inlet port and said first and second bi-directional ports are aligned on the exterior surface of said header.

13. The assembly defined in claim 12, wherein said low pressure inlet port ins intermediate said bi-directional ports.

14. The assembly defined in claim 11, wherein said low pressure inlet and said first and second bi-directional ports are aligned and said dedicated outlet port is spaced adjacent said alignment.

15. The assembly defined in claim 11, wherein said one-way valve includes spring biased spherical members.

* * * * *